United States Patent
Bär et al.

(10) Patent No.: US 11,891,970 B2
(45) Date of Patent: Feb. 6, 2024

(54) FUEL SUPPLY SYSTEM OF AN ENGINE DESIGNED AS GAS ENGINE OR DUAL-FUEL ENGINE AND ENGINE

(71) Applicant: MAN Energy Solutions SE, Augsburg (DE)

(72) Inventors: Johannes Bär, Schwabach (DE); Matthias Birner, Langweid am Lech (DE)

(73) Assignee: MAN ENERGY SOLUTIONS SE, Augsburg (DE)

( * ) Notice: Subject to any disclaimer, the term of this patent is extended or adjusted under 35 U.S.C. 154(b) by 0 days.

(21) Appl. No.: 17/869,450

(22) Filed: Jul. 20, 2022

(65) Prior Publication Data
US 2023/0036725 A1   Feb. 2, 2023

(30) Foreign Application Priority Data
Jul. 29, 2021 (DE) ...................... 10 2021 119 753.8

(51) Int. Cl.
*F02M 51/06* (2006.01)
(52) U.S. Cl.
CPC ................................ *F02M 51/061* (2013.01)
(58) Field of Classification Search
CPC .. F02M 51/061; F02M 2200/05; F02M 43/04; F02M 61/166; F02M 21/0248; Y02T 10/30; F16K 31/06
USPC ....................................................... 123/490
See application file for complete search history.

(56) References Cited

U.S. PATENT DOCUMENTS

| 3,985,333 | A | * | 10/1976 | Paulsen | F16K 31/0693 251/282 |
| 2007/0205383 | A1 | * | 9/2007 | McMiles | F16K 31/0675 251/54 |
| 2013/0112904 | A1 | * | 5/2013 | Tanari | H01F 7/081 335/297 |
| 2019/0017460 | A1 | * | 1/2019 | Döring | F02D 41/20 |
| 2020/0217286 | A1 | * | 7/2020 | Thomas | F02M 51/0653 |

FOREIGN PATENT DOCUMENTS

| DE | 3012416 | 10/1981 |
| DE | 3225180 | 1/1984 |
| DE | 3543289 | 6/1987 |
| DE | 19512339 | 10/1996 |
| DE | 102005037007 | 2/2007 |

(Continued)

OTHER PUBLICATIONS

Office Action dated Oct. 3, 2022 issued in Finnish U.S. Appl. No. 20/225,421.

(Continued)

*Primary Examiner* — Yi-Kai Wang
(74) *Attorney, Agent, or Firm* — Cozen O'Connor

(57) ABSTRACT

A fuel supply system of an engine designed as a gas engine or dual-fuel engine, has at least one solenoid valve. The solenoid valve is designed for introducing gas fuel into charge air or into a charge air line leading to at least one cylinder of the engine. The respective solenoid valve includes a valve body and an actuator with at least one magnetic plate and with at least one coil for actuating the valve body. The at least one solenoid valve of the solenoid valve is formed out of a corrosion-resistant material or is coated with a corrosion-resistant material.

11 Claims, 2 Drawing Sheets

(56) References Cited

FOREIGN PATENT DOCUMENTS

| | | |
|---|---|---|
| DE | 102006044364 | 4/2007 |
| DE | 102009038730 | 1/2010 |
| DE | 102014225922 | 6/2016 |
| DE | 102014226421 | 6/2016 |
| EP | 1336747 A2 | 8/2003 |
| JP | H 11-82800 | 3/1999 |
| WO | WO 2012/016827 | 2/2012 |

OTHER PUBLICATIONS

Office Action dated May 26, 2023 issued in Austrian Patent Application No. A 50378/2022.

* cited by examiner

FUEL SUPPLY SYSTEM OF AN ENGINE DESIGNED AS GAS ENGINE OR DUAL-FUEL ENGINE AND ENGINE

BACKGROUND OF INVENTION

1. Field of the Invention

The disclosure relates to a fuel supply system of an engine designed as gas engine or as dual-fuel engine. The disclosure, further, relates to an engine designed as gas engine or dual-fuel engine.

2. Description of Related Art

FIG. 1 shows assemblies of a dual-fuel engine 1 known from practice, wherein FIG. 1 shows a cylinder 2 of the dual-fuel engine 1. The cylinder 2 is equipped with a cylinder head 3. In the cylinder 2, a piston 4, which is guided by a connecting rod 5, moves up and down. In the cylinder head 3, a main fuel injector 6 is mounted, by way of which ignitable liquid fuel, in particular diesel fuel, can be injected from a fuel pump 8 via a fuel line 7 into a combustion space 9 of the cylinder 2. The main fuel injector 6, the fuel line 7 and the fuel pump 8 are elements of a fuel supply system which, in a first operating mode, in a so-called liquid-fuel operating mode, serves for supplying ignitable liquid fuel into the combustion space 9 of the cylinder 2. For combusting the liquid fuel, charge air 10, which is conducted via a charge air line 121, can also be introduced into the respective cylinder 2 of the dual-fuel engine 1 via inlet valves 11, wherein exhaust gas 12 developing during the combustion can be discharged from the respective cylinder 2 of the dual-fuel engine 1 via exhaust valves 13. In the combustion space 9 of the cylinder 2 of the dual-fuel engine 1 a gas fuel can be combusted in a second operating mode, in a so-called gas-fuel operating mode. For this purpose, the fuel supply system of the dual-fuel engine 1 includes at least one valve 14, via which the gas fuel, which is provided via a gas supply line 115, is introduced into the charge air line 121 conducting the charge air 10 and thus into the charge air 10. The gas-air mixture is introduced into the combustion space 9 of the cylinder 2 via the inlet valves 11.

An ignitable ignition fluid, which can be introduced into the combustion space 9 of the cylinder 2 with the help of at least one ignition fluid injector 16, serves for igniting the gas-air mixture that is inherently ignition-reluctant in the second operating mode of the dual-fuel engine 1. Here, in particular the liquid fuel or diesel fuel serves as ignition fluid. The ignition fluid injector 16 is typically a part of a separate ignition fluid supply system, wherein the ignition fluid supply system for each cylinder 2 of the dual-fuel engine 1 includes at least one ignition fluid injector 16. The at least one ignition fluid injector 16 can be preferentially supplied with ignition fluid via an ignition fluid line 17 emanating from an ignition fluid reservoir 118, wherein the ignition fluid reservoir 118 is assigned an ignition fluid feed pump 119, which supplies the ignition fluid reservoir 118 with ignition fluid. The ignition fluid feed pump 119 can be assigned a suction choke 120.

It is also possible to omit a separate ignition fluid supply system and introduce the ignition fluid into the combustion space 9 of the cylinder 2 via the main fuel injector 6 of the fuel supply system.

From practice it is already known that the charge air 10 is enriched with water. Charge air 10 enriched with water can enter the region of the valve 14 that serves for introducing the gas fuel into the charge air 10 in the gas-fuel operating mode.

Charge air 10 enriched with water is a corrosive atmosphere which can result in assemblies of the valve 14, which are embodied as solenoid valve, are subject to corrosion. In practice it has been shown that in particular magnetic plates of a valve 14 designed as solenoid valve are subject to a severe corrosion as a result of which there is the risk that the respective valve 14 can no longer be opened.

Such problems also exist with pure gas engines, in particular with pure industrial gas engines.

SUMMARY OF THE INVENTION

Starting out from this, one aspect of the invention is a new type of fuel supply system of an engine designed as gas engine or as dual-fuel engine and an engine having such a fuel supply system. According to a first aspect of the invention, this object is solved through a fuel supply system and according to a second aspect of the invention, through a fuel supply system.

According to the first aspect of the invention it is proposed that the at least one magnetic plate of the respective solenoid valve of the fuel supply system is formed of a corrosion-resistant material or coated with a corrosion-resistant material. There is then no risk that the magnetic plates upon a contact with a corrosive atmosphere, in particular with the charge air or with an atmosphere containing charge air are subject to corrosion.

According to the second aspect of the invention, the at least one magnetic plate of the respective solenoid valve of the fuel supply system according to the invention is separated or sealed off from a corrosive atmosphere, in particular from the charge air or from an atmosphere containing charge air via at least one separating element, wherein the separating element is formed from corrosion-resistant material or is coated with a corrosion-resistant material. Thus it is avoided that the corrosive atmosphere, in particular the charge air or the atmosphere containing charge air, enters the region of the magnetic plate of the respective solenoid valve where corrosion occurs.

The two aspects according to the invention can also be employed combined with one another.

An engine according to one aspect of the invention designed is gas engine or as dual-fuel engine.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

One aspect of the invention relates to a fuel supply system of an engine designed as gas engine or as dual-fuel engine and to such an engine having such a fuel supply system.

A fuel supply system of an engine designed as gas engine or dual-fuel engine includes at least one solenoid valve, wherein the respective solenoid valve is designed for introducing gas fuel into a charge air line leading to at least one cylinder of the engine and thus into the charge air.

Figure 1:
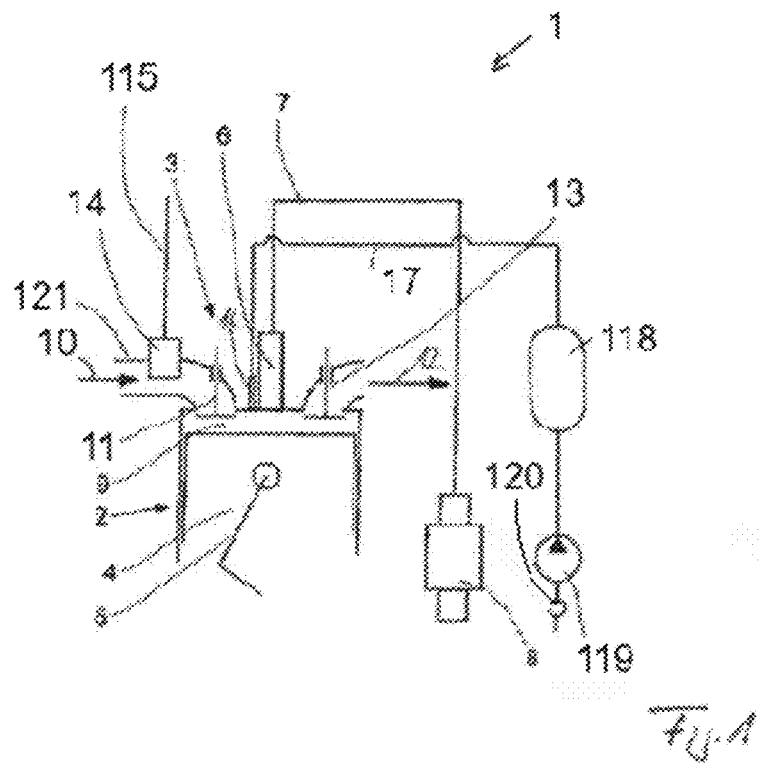
FIG. 1 is a block diagram of an engine designed as dual-fuel engine.

This solenoid valve can be the valve 14 shown in FIG. 1 for a dual-fuel engine, which serves for introducing gas fuel into the charge air 10, which is conducted via the charge air line 121.

Figure 2:
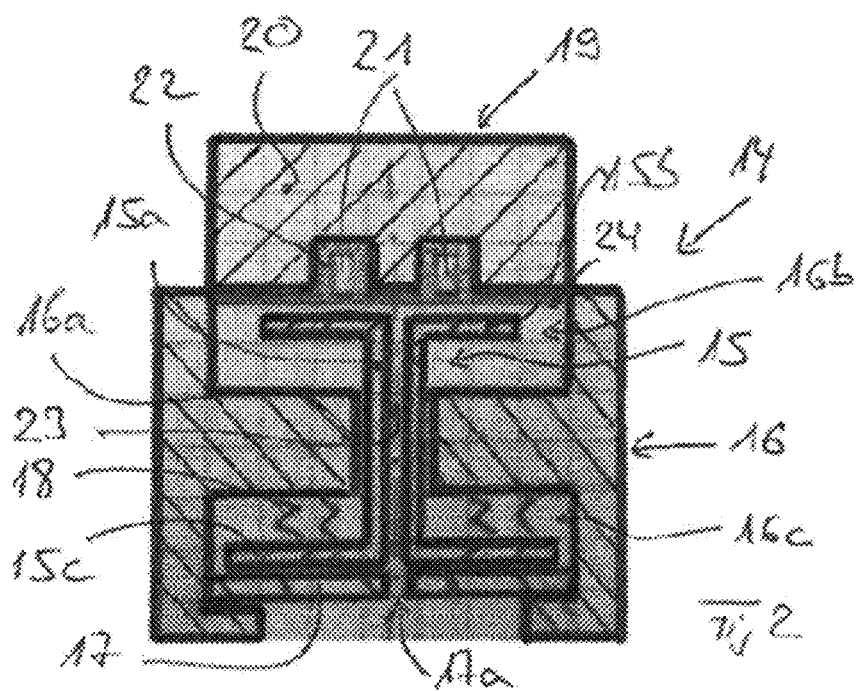
FIG. 2 is a schematised representation of a solenoid valve of a fuel supply system of an engine designed as gas engine or as dual-fuel engine.

Such a solenoid valve 14 is shown in greater detail in FIG. 2, wherein the solenoid valve 14 shown in FIG. 2 comprises a valve body 15, which is movably guided in a housing 16, namely in a guide 16a of the housing 16.

The valve body 15 is equipped with an armature 15a, an armature plate 15b, and a valve plate 15c. The armature plate 15b is formed at a first end of the armature 15a and the valve plate 15c at a second end of the armature 15a located opposite.

The valve plate 15c of the valve body 15 is followed by a fixed sealing plate 17. The first armature plate 15b is positioned in a first chamber 16b and the second armature plate 15c in a second chamber 16c of the housing 16 of the solenoid valve 14, wherein these chambers 16b and 16c are connected via the guide 16a. Here, the guide 16a is formed by a guide bore in the housing 16.

Spring elements 18 act on the valve plate 15c, which press the valve plate 15c and thus the valve body 15 against the sealing plate 17. In particular when the valve plate 15c is pressed against the sealing plate 17 the solenoid valve 14 is closed.

For actuating the valve body 15 the solenoid valve 14, furthermore, comprises an actuator 19, which is equipped with magnetic plates 20 and at least one solenoid 21. The or each solenoid 21 is typically embedded, at least partially, in an encapsulating material 22.

By electrically energising the actuator 19, the same magnetically attracts the valve body 15 lifting the same against the spring force of the spring elements 18 off the sealing plate 17 to open the solenoid valve 14. Then, gas fuel can flow out of the chamber 16c via the at least one recess 17a in the sealing plate 17.

In FIG. 2, a connecting bore 23 is introduced into the armature 15a, via which for the pressure equalisation, charge air or atmosphere containing charge air can flow into the chamber 16b.

In the process, the charge air can be enriched with water. Charge air enriched with water is a corrosive atmosphere.

In order to protect the respective magnetic plate 20 of the solenoid valve 14 from corrosion it is provided in FIG. 2 to seal the respective magnetic plate 20 against a corrosive atmosphere, namely against the charge air-containing atmosphere in the chamber 16b, via a separating element 24, wherein this separating element 24 in FIG. 2 is a plate-like separating element 24 and thus a separating plate formed from a corrosion-resistant material or is coated with a corrosion-resistant material.

In FIG. 2, this separating element 24 seals not only the respective magnetic plate 20 but also at least one coil 21 against the charge air-containing and thus corrosive atmosphere.

Figure 4:
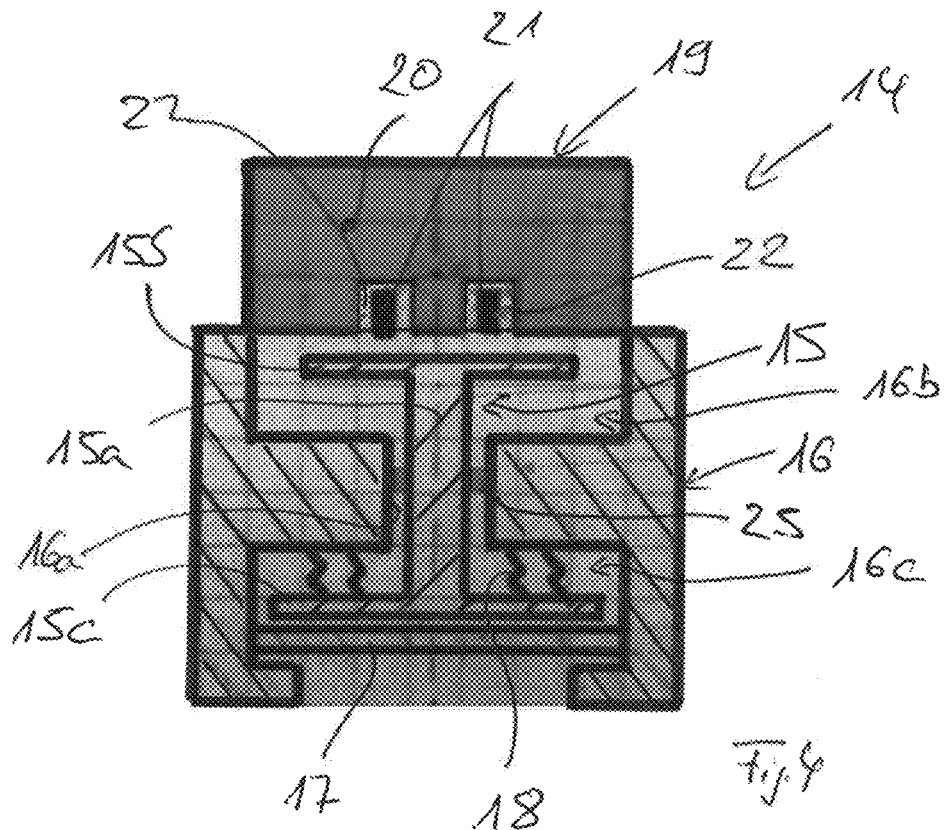
FIG. 4 is a schematised representation of a solenoid valve of a fuel supply system of an engine designed as gas engine or as dual-fuel engine.

FIG. 4 shows a further embodiment of a solenoid valve 14 of a fuel supply system according to one aspect of the invention, which differs from the solenoid valve 14 of FIG. 2 in that no pressure equalisation bore 23 is introduced into the armature 15a. Since atmosphere containing charge air and accordingly corrosive atmosphere can nevertheless flow via a gap between the guide 16a and the armature 15a from the second chamber 16c into the first chamber 16b of the solenoid valve 14, it is provided in FIG. 4 to arrange in this gap a separating element 25, which consists of a corrosion-resistant material or is coated with a corrosion-resistant material. This separating element 25 can be a seal. By way of this it is also prevented that charge air-containing and thus corrosive atmosphere enters the region of the magnetic plates 20 and coils 21 leading to corrosion there.

In order to prevent a corrosion of the separating element 24, 25 the same is formed out of the corrosion-resistant material or coated with the corrosion-resistant material.

The measures of FIGS. 2 and 4 can also be utilised combined with one another.

Figure 3:
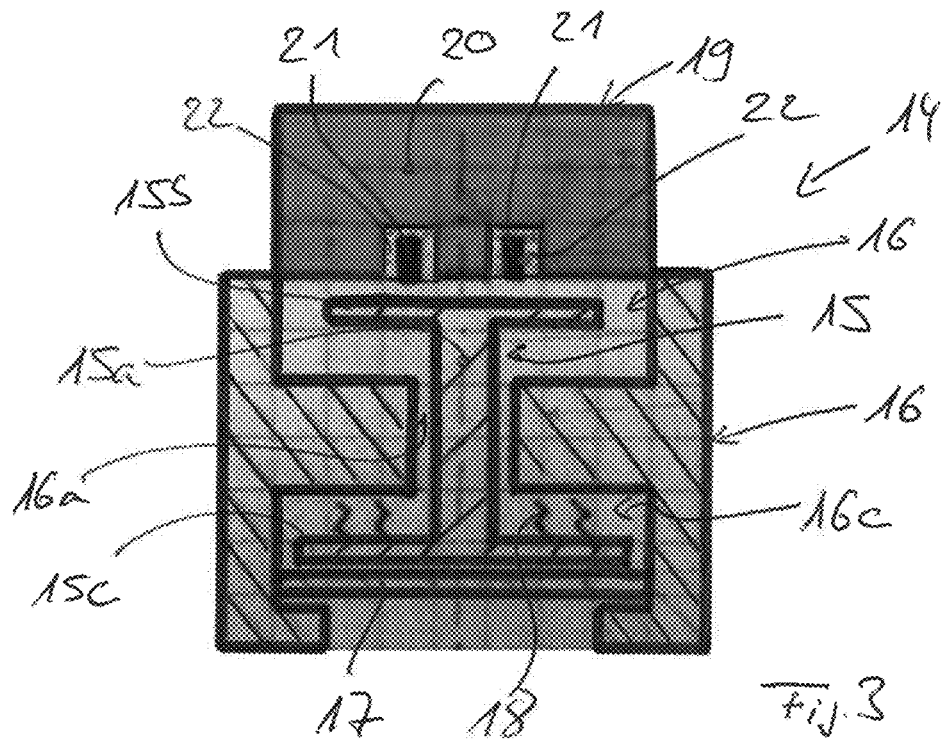
FIG. 3 is a schematised representation of a solenoid valve of a fuel supply system of an engine designed as gas engine or as dual-fuel engine.

FIG. 3 shows a further solenoid valve 14, wherein the solenoid valve 14 of FIG. 4 likewise does not comprise a pressure equalisation bore in the region of the armature 15a of the valve body 15. With the solenoid valve 14 of FIG. 3 it is proposed that the at least one magnetic plate 20 of the solenoid valve 14 is formed from a corrosion-resistant material or consists of a corrosion-resistant material. Thus, even when the respective magnetic plate 20 comes into contact with a charge air-containing and thus corrosive atmosphere can a corrosion of the same be prevented.

The aspect of FIG. 3, namely the forming of the respective magnetic plate out of a corrosion-resistant material or the coating of the same with a corrosion-resistant material can be combined with the aspects of FIGS. 2 and 4.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fuel supply system of an engine configured as a gas engine or as a dual-fuel engine, comprising:
   at least one solenoid valve configured for use in a corrosive atmosphere, wherein the at least one solenoid valve is configured to introduce gas fuel into charge air or into a charge air line leading to at least one cylinder of the engine,
   wherein the respective solenoid valve configured for use in the corrosive atmosphere comprises:
      a valve body;
      an actuator with at least one magnetic plate that is exposed to the corrosive atmosphere; and
      at least one coil configured to actuate the valve body, wherein an entirety of the at least one magnetic plate of the respective solenoid valve, which is in direct contact with the corrosive atmosphere, is formed from a corrosion-resistant material or is coated with a corrosion-resistant material, wherein the at least one coil of the at least one solenoid valve is directly embedded in the at least one magnetic plate.

2. The fuel supply system according to claim 1, wherein the at least one coil of the at least one solenoid valve is separated or sealed from a corrosive atmosphere by at least one separating element.

3. The fuel supply system according to claim 2, wherein the at least one separating element is formed out of a corrosion-resistant material or is coated with a corrosion-resistant material.

4. A fuel supply system of an engine configured as gas engine or dual-fuel engine, comprising:
at least one solenoid valve configured for use in a corrosive atmosphere and configured to introduce gas fuel into charge air or into a charge air line leading to at least one cylinder of the engine,
wherein the at least one solenoid valve configured for use in the corrosive atmosphere comprises:
a valve body;
an actuator with at least one magnetic plate;
at least one coil configured to actuate the valve body; and
at least one separating element, which is entirely planar and formed out of a corrosion-resistant material or is coated with a corrosion-resistant material and is configured to separate or seal the at least one magnetic plate from exposure to the corrosive atmosphere of the at least one solenoid valve from a corrosive atmosphere which is one of the charge air or a charge air-containing atmosphere.

5. The fuel supply system according to claim 4, wherein the at least one coil of the at least one solenoid valve is also separated or sealed from the corrosive atmosphere, which is one of the charge air or the charge air-containing atmosphere, via the at least one separating element.

6. The fuel supply system according to claim 4, wherein the at least one separating element is a separating plate that separates or seals the at least one magnetic plate of the at least one solenoid valve from a chamber of the at least one solenoid valve containing the corrosive atmosphere.

7. The fuel supply system according to claim 4, wherein the at least one separating element is a seal that separates and seals a gap between an armature of the valve body of the at least one solenoid valve and a guide for the armature.

8. The fuel supply system according to claim 4, wherein the at least one magnetic plate of the at least one solenoid valve is formed out of a corrosion-resistant material or coated with a corrosion-resistant material.

9. An engine, namely gas engine or dual-fuel engine, comprising:
at least one cylinder; and
a fuel supply system, comprising:
at least one solenoid valve configured for use in a corrosive atmosphere, wherein the at least one solenoid valve is configured to introduce gas fuel into charge air or into a charge air line leading to the at least one cylinder of the engine,
wherein the respective solenoid valve configured for use in the corrosive atmosphere comprises:
a valve body;
an actuator with at least one magnetic plate that is exposed to the corrosive atmosphere; and
at least one coil configured to actuate the valve body,
wherein an entirety of the at least one magnetic plate of the respective solenoid valve, which is planar and in direct contact with the corrosive atmosphere, is formed from a corrosion-resistant material or is coated with a corrosion-resistant material.

10. The fuel supply system according to claim 1, wherein the at least one magnetic plate is arranged at an axial end of the valve body.

11. The fuel supply system according to claim 4, wherein the valve body comprises:
an armature;
an armature plate formed at a first end of the armature; and
a valve plate at a second end of the armature opposite the first end,
wherein the armature has a longitudinal bore configured for pressure equalization between the first and second ends of the armature.

\* \* \* \* \*